March 27, 1951 S. C. PETRILLI 2,546,951
ARTICLE TRANSFER MECHANISM
Filed Oct. 11, 1945 3 Sheets-Sheet 1

INVENTOR.
Santy C. Petrilli
BY
Moore, Olson / ...
attys

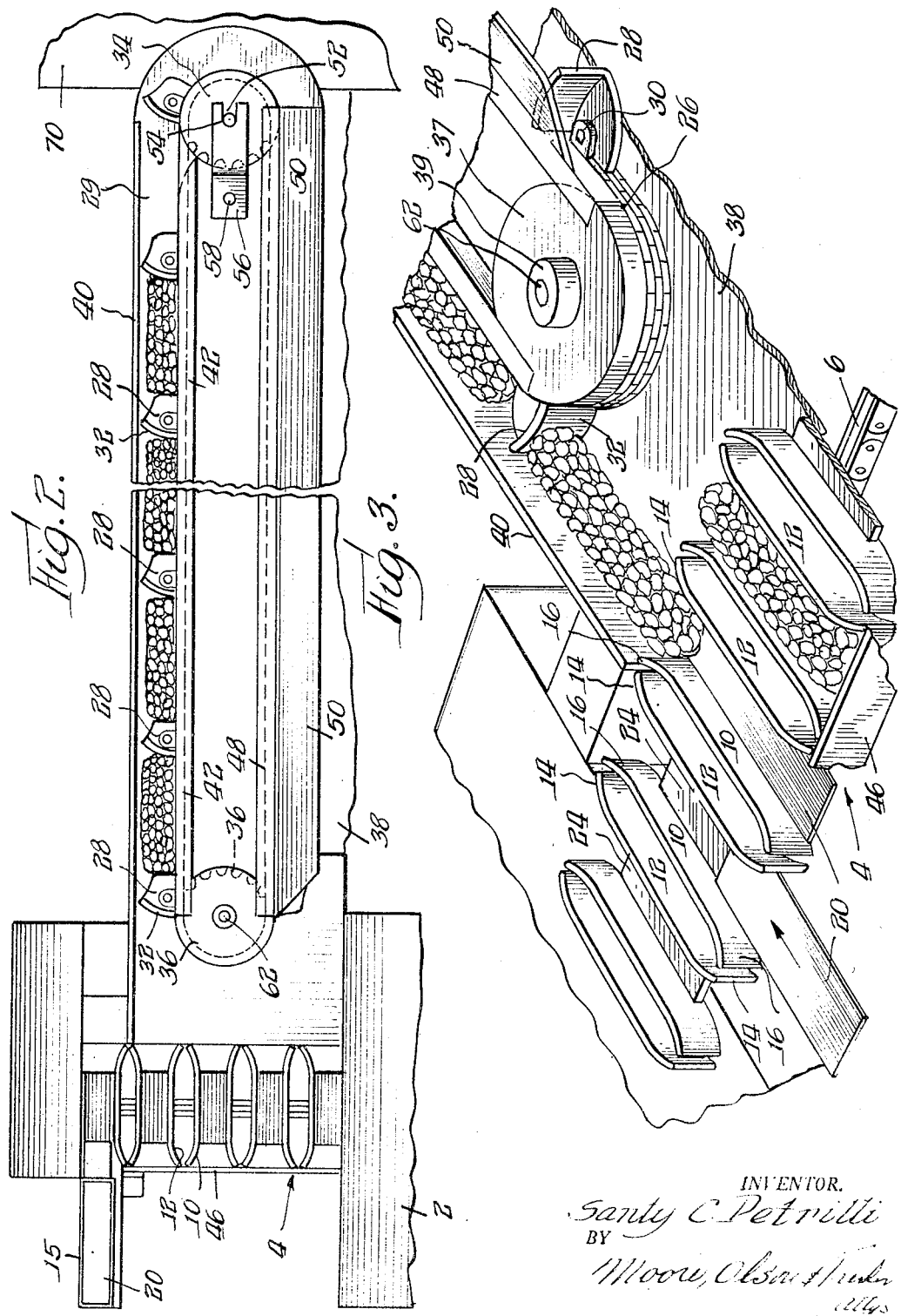

March 27, 1951     S. C. PETRILLI     2,546,951

ARTICLE TRANSFER MECHANISM

Filed Oct. 11, 1945     3 Sheets-Sheet 3

INVENTOR.
Santy C. Petrilli
BY
Moore, Olson & Trexler
attys

Patented Mar. 27, 1951

2,546,951

UNITED STATES PATENT OFFICE 2,546,951

ARTICLE TRANSFER MECHANISM

Santy C. Petrilli, Chicago, Ill., assignor to General Candy Corporation, Chicago, Ill., a corporation of Illinois Application October 11, 1945, Serial No. 621,682

9 Claims. (Cl. 198—20)

This invention is highly adaptable for other articles than the ones illustrated in the present exemplification. The invention is specifically and particularly adapted to the safe feeding of chocolate covered bars which in general comprise a candy core of caramel with a coating of chocolate, with peanuts embedded in the chocolate coating and likewise covered with chocolate. Obviously any other type of candy bar, suitable so to be fed, may be used, or in fact any type of article suitably fed is within the contemplation of this invention.

Among the objects of the present invention is to provide an automatic means for feeding a succession of articles, such as chocolate covered candy bars, in suitably spaced relation to the inlet feeding mechanism of a wrapping machine, the feeding mechanism being arranged so that it is practically impossible for the fingers of the feeding operator who feeds the candy bars into the machine, to be caught or injured by the automatic feeding mechanism.

Yet another object of the invention resides in providing a power driven automatic feeding mechanism for feeding a succession of candy bars to the inlet end of a wrapping machine wherein the candy bars or other articles are automatically propelled forwardly from the inlet feeding end of the mechanism in spaced relation and are pushed forwardly into pockets on an adjacent in-feeding mechanism of the packing machine by the arcuate movement of feeding lugs as they move arcuately at the termination of the feeding movement and at the junction of the first feeding apparatus and the in-feeding apparatus of the packaging machine.

Yet another object of the invention resides in providing a power driven automatic means for feeding a succession of candy bars to the travelling in-feeding mechanism of a wrapping machine wherein both feeding mechanisms are disposed in a common horizontal plane, are spaced apart at their junction, and wherein the first feeding mechanism to handle the bars is provided with an endless series of feeding lugs which push candy bars along a predetermined path and which lugs in a part of their movement travel arcuately and operate to project or substantially throw the candy bars outwardly of the first feeding mechanism into a series of travelling pockets which sequentially register with the series of projected bars so that each bar will move into a pocket of the in-feeding mechanism of the packaging machine, and whereby the two feeding mechanisms are suitably spaced apart in such common planes that the fingers of the operators cannot be jammed between the two feeding mechanisms and be injured.

These and other objects of invention will be apparent from a perusal of the following specification, when taken in connection with the accompanying drawings, wherein:

Figure 2 is a plan view of part of the mechanism shown in Figure 1;

Figure 3 is a fragmentary perspective view of the discharge end of the safety drive wherein the bar is projected from the safety conveyor into the wrapping machine conveyor;

As hereinbefore stated, in the packaging of candy bars they must be fed sequentially to the wrapping machine from either a travelling belt on which the candy bars are fed or from a box or similar container, and the present invention is concerned with a safety feeding mechanism disposed to cooperate with the endless in-feeding mechanism or belt of the wrapping machine so that a manual operator merely deposits the chocolate bars or other articles from a safe feeding station in front of a series of travelling lugs on an endless belt, and these lugs thereafter carry the series of candy bars and automatically feed them into the series of travelling pockets of the in-feeding end of the wrapping machine, and without danger to the operator and in a manner which minimizes injury to the candy bars.

Figure 1:
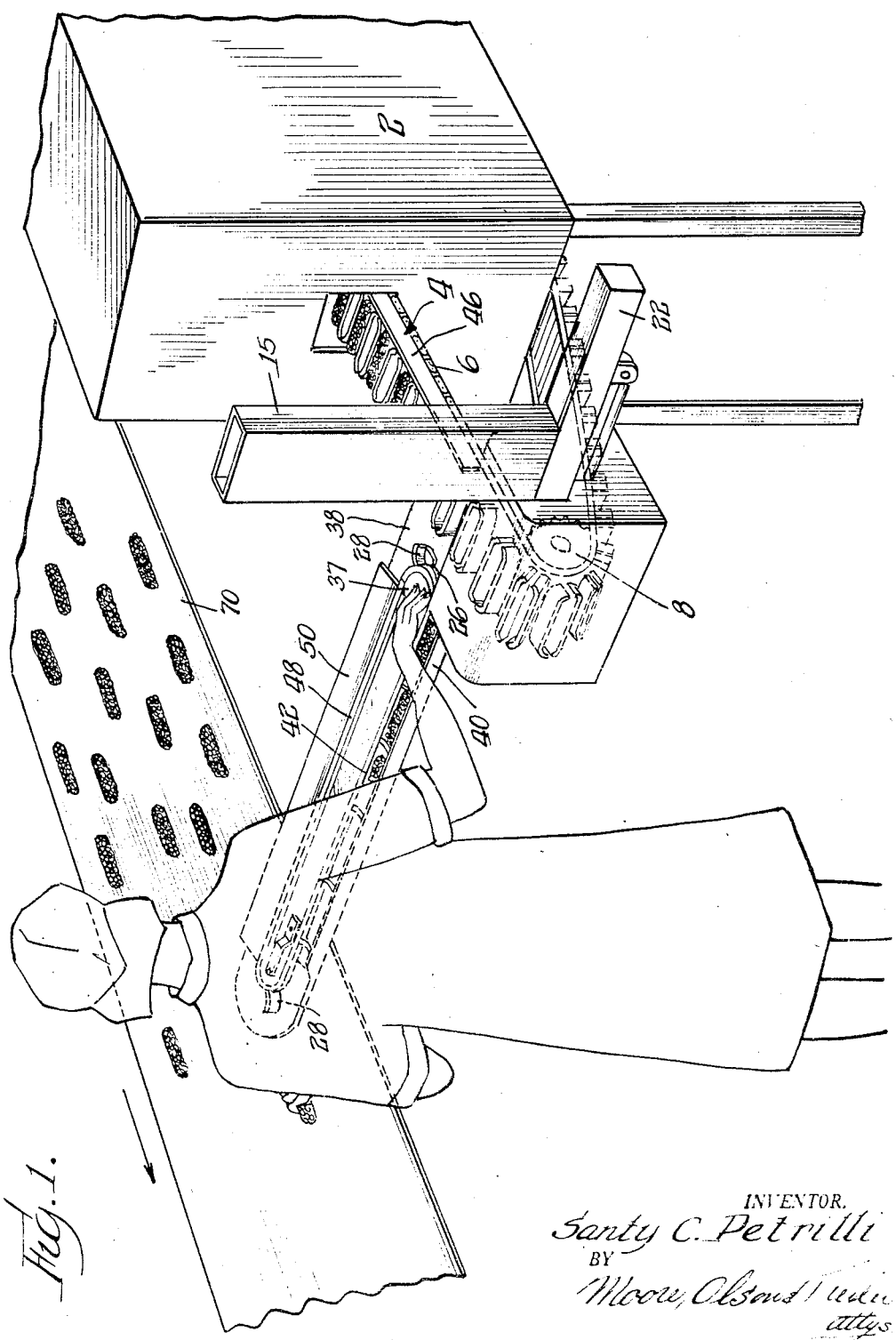
Figure 1 is a perspective, partially diagrammatic view showing the proposed arrangement of the mechanism for feeding candy bars, in the present instance from a travelling belt or box as a source of supply to a transfer feeding mechanism, and thence to the in-feeding mechanism of the wrapping machine.
Figure 4:
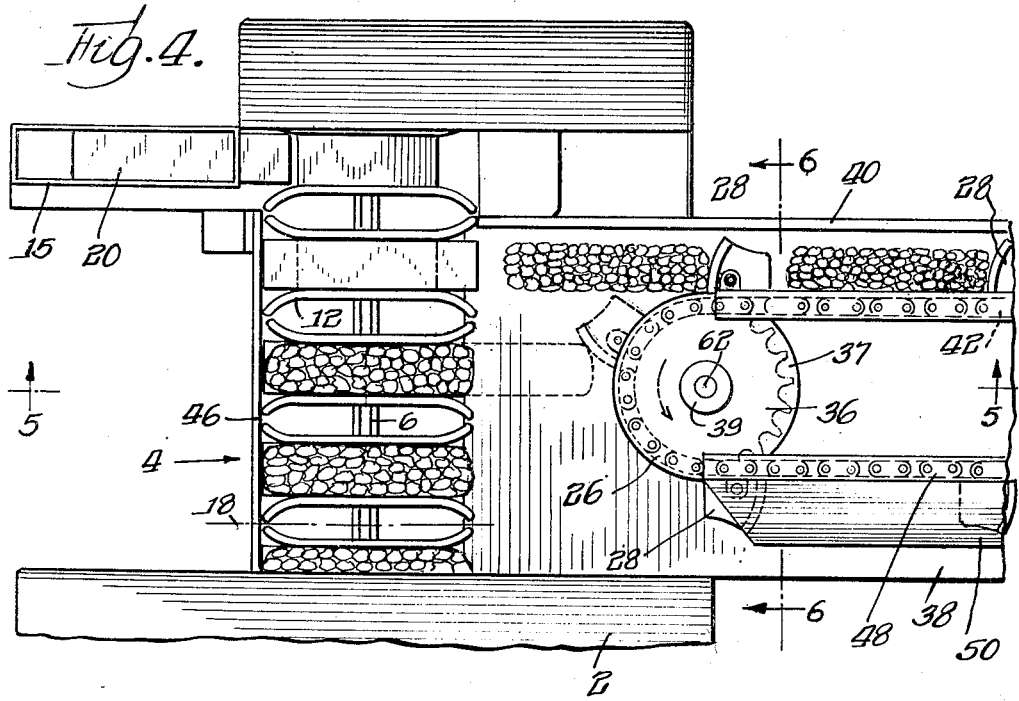
Figure 4 is a partial plan view of the discharging end of the safety conveyor and its association with the wrapping machine conveyor.
Figure 5:
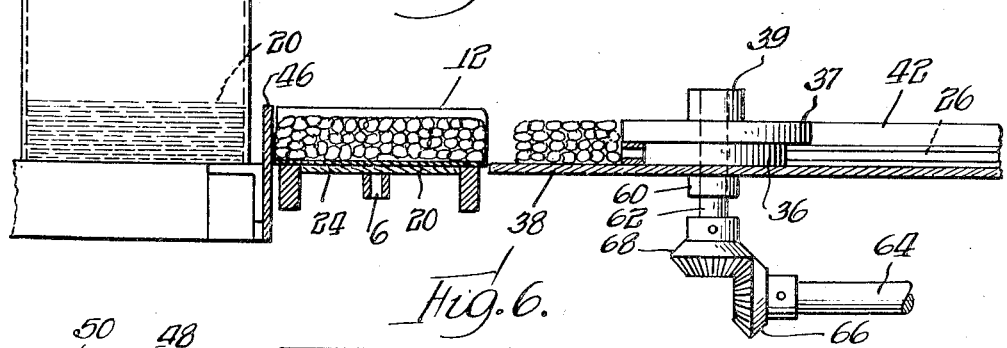
Figure 5 is a section taken on the line 5—5 of Figure 4.

In order to describe the invention it has been shown herein as applied to a wrapping machine 2 of any desired description, and having an in-feeding conveyor 4, preferably of the endless belt type and preferably driven intermittently by and at a very fast rate of speed in any suitable manner, such for instance as by sprocket chains 6 which mesh with spaced sprocket wheels, one of which is shown at 8. The upper surface of this in-feeding belt 4 comprises a series of spaced pockets formed by pairs of elongated guides 10 and 12 which spacedly confront each other. The ends of these guides forming the pockets are curved toward each other as at 14 and 16, as shown in Figure 3, so that the ends 14 and 16 of the confronting guides 10 and 12 curve away from each other whereby to direct a candy bar into the pocket formed by the spaced confronting guides 10 and 12. These guides are arranged to break in between so that they can pass around the sprocket 8 as shown in Figure 1. In short, they break along the line 18 shown in Figure 4. In association with the wrapping machine there is a vertical chute or container 15 adapted to receive a pile or stack of relatively thin cardboard strips 20 which are fed by suitable mechanism into the bottom of the pockets 24, see Figure 3, to receive thereupon the candy bars so that as the candy bars pass into the wrapping machine 2 each candy bar will lie upon a paper strip 20 and will then be wrapped by a wrapper in the wrapping machine, the details of which form no part, other than in association with the in-feeding mechanism about to be described, of the present invention. It will be noted, however, that the in-feeding endless belt mechanism, including the pockets 24, is arranged to feed the candy bars in a straight line motion in a horizontal plane in a single predetermined direction into the wrapping machine.

Figure 6:
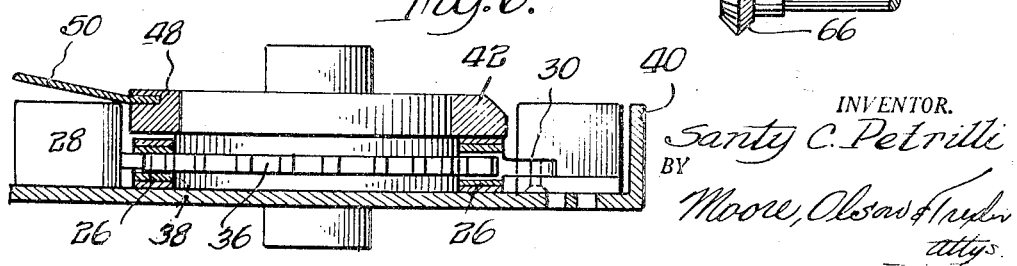
Figure 6 is a transverse section taken on the line 6—6 of Figure 4.

Associated with this conveyor is another conveyor disposed to feed candy bars at right angles thereto and in timed relation thereto, but which is continuously operated and which lies in the same horizontal plane as the horizontal plane in which the first in-feeding conveyor is disposed. This second mentioned conveyor comprises an endless chain 26 of the sprocket type, carrying a series of outstanding feeding lugs 28 which are pivotally attached to the chain as at 30, see Figure 6. These lugs have an arcuately shaped feeding surface 32, as hereinafter explained. This chain passes around two sprockets 34 and 36. One of these sprockets 36 lies in spaced relation but relatively close to the path of travel of the pocket mechanism 24 on the first mentioned conveyor. There are a series of these feeding lugs 28, as shown clearly in Figure 2, and they are spaced apart preferably the distance of a candy bar or similar article to be fed, so that an operator standing near can quickly and conveniently place a succession of candy bars into the space between the lugs. These lugs 28 travel over a horizontal table or platform 38 and are pushed therealong in a predetermined path by the chain 26. An upstanding guide flange 40 is disposed at one side of the table to keep the candy bars between the lugs. In addition there is another upstanding elongated guard 42 which overlies the path of movement of the chain and is disposed between but to one side of the centers of the sprockets 34 and 36. Thus there is provided between the upstanding rail 40 and the elongated guard 42 an elongated way between which the feeding lugs 28 move in rectilinear fashion and at right angles to the path of movement of the first mentioned conveyor 6 having the pockets 24 thereon. As each curved lug 28 reaches the end sprocket 36 and begins to pass around said sprocket, the lug will accelerate and in so doing will throw, project or centrifuge the candy bar which it is pushing outwardly. Referring to Figure 3, at the time that the lug reaches the point which begins its arcuate travel, the front end of the candy bar will have been projected by this lug into the entering end of the pocket 24 between the adjacent curved ends 14 and 16 of the pocket, and then as the lug 28 accelerates in its arcuate movement, it will thus move faster and quickly push or project the candy bar outwardly. There is a point reached in the arcuate travel of each lug wherein it is no longer contacting the end of the candy bar in a pushing operation, while at the same time the candy bar is still travelling away from the lug, further into the pocket, until it finally completely rides in the pocket. A guard 46 is disposed on the opposite side of the candy bar, which serves to arrest the candy bar as it arrives in the pocket and thus positions it exactly in the pocket.

It will be noted from an examination of Figure 3 that the sprocket chain 26 passes around the sprocket 36. There is another guard 48 which parallels the guard 42 and overlies the opposite reach of the chain as the lugs thereon are moving in the opposite direction or away from the first mentioned conveyor. The guard 48 supports an outstanding flange 50 which overlies these lugs so as to act as a safety for the operator. In addition, the shaft 52 of the first sprocket 34 is mounted in a recess 54 on a bracket 56 which is fixed as at 58 on the top of the table 38. The opposite end of the table carries a bearing 60 which supports a vertical shaft 62 that carries the sprocket 36. The ends of the two guards 42 and 48 support a disc 37 the upper end of which is provided with a bearing 39 supporting the upper end of the shaft 62. Thus this circular guard 37 overlies the sprocket chain 26 at that end of the transversely disposed conveyor which lies adjacent the first mentioned conveyor 4 and thus shields the hand of the operator and ensures that the fingers of the operator cannot be caught or injured by the conveyor chain 26. The shaft 62 is driven by means of a shaft 64 suitably geared as at 66 to another gear 68 on the shaft 62 and this shaft 64 is driven in timed relation to the intermittent drive for the conveyor 6.

A relatively broad belt 70 is shown as disposed to travel in the direction indicated by the arrow in Figure 1 and carrying on its upper surface a series of spaced apart candy bars which are removed by the operator and placed in the succession of spaces 29 between the lugs 28 on the transversely disposed conveyor. If desired the operator may take the candy bars from a box and feed them into the spaces 29 on the transverse conveyor for precise, successive and safe feeding delivery to the in-feeding conveyor of the wrapping machine and without any opportunity for endangering the fingers of the operator.

It will be noted that the transverse conveyor and the in-feeding conveyor of the wrapping machine operate in a common horizontal plane, and that at the junction of these two conveyors there is a space wherein the candy bar carried by the first conveyor is automatically projected into pockets on the in-feeding conveyor of the wrapping machine so that it is not necessary for the operator to touch the candy bars after she has once deposited them into the pockets of the transverse continuously operating conveyor.

In certain instances it is within the contemplation of the invention, if the wrapping mechanism permit, to drive the conveyor 4 in a continuous synchronized relation with respect to the transverse conveyor. The projecting action of the lugs as they move arcuately and the synchronization of the two conveyors safely and accurately transferring the succession of candy bars to the other without any jeopardy to the operator.

Obviously the invention is not limited to the specific details of construction disclosed herein but is capable of other modifications and changes without departing from the spirit and scope of the appended claims.

Having thus described my invention, what I claim as new and desire to secure by Letters Patent is:

1. In a device for feeding substantially elongated bars of candy or other material, the combination of a conveyor formed with a series of spaced apart pockets each having an open end, means for moving said series of pockets for at least a portion of their movement in an elongated substantially straight path disposed in a predetermined horizontal plane, a conveyor movable along an elongated path disposed transversely to said first straight path and merging into an arcuate path or reach disposed in said plane and with the axis or center of said arcuate path disposed vertically, said arcuate path being disposed adjacent to but spaced from the path of movement of the open ends of the pockets of the first mentioned conveyor, said second conveyor including spaced outstanding pushing members thereon of such a length that their outer ends are substantially spaced from the adjacent open ends of the pockets of said first conveyor when said pushing members are moving arcuately, and means for continuously moving said second mentioned conveyor to cause the pushing members of the conveyor to push successive spaced bars in a direction transversely of and toward the open pockets of the first mentioned conveyor, until each pushing member reaches said arcuate path and whereupon to cause said successive pushing members to move with increased velocity arcuately and for a short travel substantially parallel to the path of movement of said open-ended pockets, said successive pushing members projecting bars across the intervening space located between the path of movement of the outer portions of said pushing members and the adjacent spaced apart path of travel of the open ends of said pockets and into said successive pockets.

2. In a device for feeding substantially elongated bars of candy or other material, the combination of a series of pockets disposed substantially in parallelism and each having an open end, means for moving said series of pockets for at least a portion of their movement in an elongated, substantially straight path disposed in a predetermined horizontal plane, an endless conveyor operable in a closed path which includes parallel, spaced apart, substantially straight reaches, joining to arcuately disposed end portions wherein one of the straight reaches is disposed at substantially right angles to the path of movement of the series of pockets and wherein one of the arcuate portions of said second conveyor lies adjacent but spaced from the path of movement of the series of spaced pockets, said second conveyor operating in the same horizontal predetermined plane, and having the axial center of said last mentioned arcuate portion disposed vertically, means for continuously operating said second conveyor, said second conveyor including spaced outstanding pushing members thereon of such length that their outer ends are substantially spaced from the adjacent open ends of the pockets of the first conveyor when said pushing members are moving through said last mentioned arcuate path, and means for continuously moving said second mentioned conveyor to cause the pushing members to push successive bars in a direction transversely of and toward the open pockets of the first mentioned conveyor until each pushing member reaches said arcuate path and whereupon to cause said successive pushing members to move with increased velocity along said arcuate path and for a short travel in the general direction of the path of movement of the open-ended pockets whereby during said movements said successive pushing members project the bars across the intervening space located between the path of movement of the outer portions of the pushing members and the adjacent spaced paths of travel of the open ends of said pockets and into said pockets.

3. A device including the structure set forth in claim 1 wherein guide means is provided parallel to the straight path portion of the second conveyor and terminating closely adjacent but spaced from the path of travel of the outermost ends of the pocket members of the first conveyor for aiding and directing a bar into each pocket as it comes into a predetermined position with respect to said guide member so as to direct a bar pushed by one of the pushing members of the second conveyor into the open mouth of said pocket.

4. A construction as set forth in claim 2 wherein an abutment means is provided at the opposite end of each one of the pockets against which the projected bar is adapted to strike, for positioning a bar in said pocket.

5. In a device for feeding substantially elongated bars of candy or other material, the combination of a support including a substantially horizontal floor member, a conveyor formed with a series of spaced apart, substantially parallel arranged pockets each having an open end, means for moving said series of pockets for at least a portion of their movement in an elongated, substantially straight path disposed substantially in the horizontal plane of the floor member, a pair of spaced apart sprocket members having their axes disposed vertically, a sprocket chain passing around said sprockets and providing a pair of parallel elongated reaches between said sprockets, said reaches extending in a direction at right angles to the path of movement of the first conveyor, said sprockets having spaced apart outstanding lugs thereon adapted to move over said horizontal floor member, said lugs being spaced apart slightly more than the distance corresponding to the length of a bar to be projected, said lugs being of a length such that in passing around the sprocket adjacent the path of travel of the pockets of the first conveyor, they provide a substantial space between the outermost end of each lug and the adjacent ends of said pocket members whereby to provide clearance therebetween of the fingers of an operator, and means for continuously operating said second mentioned conveyor to cause bars to be pushed by said sprockets as they move along the reach in the direction of travel of and around the periphery of the sprocket adjacent the path of travel of the pockets so as to project the bars through the intervening space and into each of the successive pockets.

6. A device in accordance with claim 5 wherein guard means is provided adapted to overlie the path of movement of the sprocket chains.

7. A device is accordance with claim 5 wherein guard means is provided adapted to overlie the path of movement of the sprocket chains, and additional guard means to overlie that portion of the path of movement of the sprocket chain and outstanding lugs when the lugs are passing from the first mentioned sprocket back to the opposite spaced apart sprocket whereby to protect the fingers of the operator.

8. A device in accordance with claim 5 wherein the lug members have backwardly curved pushing faces and are pivotally connected to the sprocket chain by vertically disposed pivot members.

9. In a device for feeding substantially elongated bars of candy or other material, the combination of a conveyor formed with a series of spaced apart pockets each having an open end, means for moving said series of pockets for at least a portion of their movement in an elongated, substantially straight path disposed in a predetermined horizontal plane, a platform in said plane adjacent said conveyor, a second conveyor including a plurality of bar engaging members for projecting a spaced series of bars in a direction toward said moving series of pockets at a predetermined constant speed to a predetermined point spaced a substantial distance from the path of movement of the innermost adjacent ends of the series of pockets, and means for moving said bar engaging members over the surface of said platform at an accelerated linear speed as said predetermined point is reached for projecting said bars through said intervening space across said platform and into each of the succeeding pockets as they register with the path of movement of the series of bars, said space being substantially greater in extent than the distance between the path of movement of the mouths of said pockets and the nearest path of travel of said bar projecting members.

SANTY C. PETRILLI.

REFERENCES CITED

The following references are of record in the file of this patent:

UNITED STATES PATENTS

| Number | Name | Date |
|---|---|---|
| 1,581,200 | Guenther | Apr. 20, 1926 |
| 1,774,047 | Wharton | Aug. 26, 1930 |
| 2,141,226 | Rubel et al. | Dec. 27, 1938 |
| 2,155,398 | Bronander | Apr. 25, 1939 |
| 2,247,695 | Papendick | July 1, 1941 |